United States Patent [19]

Shirahata et al.

[11] Patent Number: 5,078,444
[45] Date of Patent: Jan. 7, 1992

[54] MOLDING FOR WINDSHIELD OF AUTOMOBILE AND ITS MOLDING APPARATUS

[75] Inventors: Itaru Shirahata; Yoichi Hirai, both of Aichi, Japan

[73] Assignee: Tokai Kogyo Kabushiki Kaisha, Aichi, Japan

[21] Appl. No.: 600,810

[22] Filed: Oct. 22, 1990

[30] Foreign Application Priority Data

Oct. 27, 1989 [JP] Japan ................... 1-281296

[51] Int. Cl.$^5$ ............................................. B60J 1/00
[52] U.S. Cl. ........................... 296/93; 296/201; 52/208; 52/400
[58] Field of Search ............ 296/93, 201; 52/208, 52/397, 400

[56] References Cited

U.S. PATENT DOCUMENTS

| | | | |
|---|---|---|---|
| 4,757,659 | 7/1988 | Miyakawa et al. | 52/400 |
| 4,765,936 | 8/1988 | Ballocca | 264/46.1 |
| 4,865,796 | 9/1989 | Tamura et al. | 264/40.7 |
| 4,884,380 | 12/1989 | Yada et al. | 52/208 |

*Primary Examiner*—Robert R. Song
*Attorney, Agent, or Firm*—Wenderoth, Lind & Ponack

[57] ABSTRACT

A molding for a windshield has an upper molding portion, corner molding portions integral with opposite ends of the upper molding portion and side molding portions integral with the corner molding portion. Only the side molding portions have a groove lip extending therefrom for defining a rain water guide groove. The groove lip of each side molding portion has a projection length which progressively increases from the corner portion to the side portions. Further, each of the molding portions has an upper decoration portion, a lower clamp lip and a metal fitting connecting the upper decoration portion to the lower clamp lip.

6 Claims, 5 Drawing Sheets

MOLDING FOR WINDSHIELD OF AUTOMOBILE AND ITS MOLDING APPARATUS

FIELD OF THE INVENTION

This invention relates to a molding for a windshield of an automobile for sealing the gap occurring between the peripheral portion of the windshield of an automobile and a window frame of a body and for decorating that portion, and to its molding apparatus.

DESCRIPTION OF THE PRIOR ART

Recently, side moldings 32a among moldings for windshield of this kind (hereinafter called merely the "molding") which are fitted to both side portions of a front glass 31, have been provided with a rain water guide groove 33 as shown in FIG. 10 of the accompanying drawings. These grooves 33 are disposed in order to prevent sideway scattering and subsequent invasion of rain water, adhering to the windshield 31 during driving, into a driver's seat or the obstruction of the field of view from the driver's seat due to rain water adhering to door glasses on the side.

However, the side moldings 32a equipped with the rain water guide grooves 33 cannot be used for the upper portion of the windshield 31. Therefore, an upper molding 32b not equipped with the rain water guide groove 33 is molded separately and is connected and fitted to the side moldings 32a by use of corner joints 34. In other words, the conventional molding consists of five components, that is, two side moldings 32a, one upper molding 32b and two corner joints 34.

Accordingly, the number of components is large and the number of man-hours used in assembly becomes great, too, so that the cost of production becomes high. Furthermore, it is difficult to bring the luster. color tone, and the like of the corner joints 34 into strict conformity with those of the side and upper moldings 32a and 32b, so that the joint portions 35 between them become recognizable and give an awkward appearance. Still another problem is that a gap occurs at a joint portion 35 between the corner joints 34 and each molding 32a and 32b and damage is likely to start at this portion.

SUMMARY OF THE INVENTION

The molding in accordance with the present invention has a construction wherein a groove lip, whose projecting length increases progressively from a corner portion to a side portion, is formed projectingly on the inner peripheral side of a decoration portion constituting the molding in such a manner as to integrate side molding portions and an upper molding portion with one another, a rain water guide groove is defined by the groove lip between it and the front glass at only the side molding portions.

Accordingly, since the side molding portions and the upper molding portion can be integrated by forming the rain water guide groove at only the side molding portions, the corner joints that have been necessary in the conventional moldings are not necessary and the strength at the corner portions of the molding can be improved. Since joints do not exist at the corner portions, the overall appearance can be improved. Accordingly, the number of components of the molding becomes only one, and the man-hours used for assembly can be reduced, so that the cost of production can be reduced. Since the present invention employs a structure wherein a groove lip is formed on the inner peripheral side of the decoration portion of each side molding portion, and the rain water guide groove is defined between it and front glass, the thickness of the decoration portion of each of the side molding portion and the upper molding portion can be made equal, and in this respect the appearance of the molding can also be improved.

The molding apparatus of the molding in accordance with the present invention comprises a basic molding die equipped with an extrusion molding port corresponding to the sectional shape of the side molding portions. A movable molding die is fitted movably to the front surface of the basic molding die for changing the projecting length of the groove lip of the side molding portions. Accordingly, the movable molding die is moved back and forth during molding so as to change the groove lip formation portion length at the extrusion molding port. In this manner, the side molding portions which have the groove lip formed projectingly on the inner peripheral side of the decoration portion and the upper molding portion not equipped with this groove lip can be continuously molded together.

BRIEF DESCRIPTION OF THE DRAWINGS

FIGS. 1 to 9 are drawings useful for explaining the present invention, wherein:

FIG. 1 is a perspective view of an automobile to which a molding ($M_1$) in accordance with the present invention is fitted;

FIG. 2 is an enlarged sectional perspective view of a corner portion of the molding ($M_1$) shown by (C) in FIG. 1;

FIGS. 3 and 4 are enlarged sectional views taken along line $X_1$—$X_1$ and line $X_2$—$X_2$ in FIG. 2, respectively;

FIG. 5 is a front view of a molding apparatus for the molding ($M_1$);

FIG. 6 is a schematic view useful for explaining that a side molding portion ($M_{1a}$) and an upper molding ($M_{1b}$) are continuously molded by the molding apparatus in accordance with the present invention;

FIG. 7 is a detailed schematic view of FIG. 6; and

FIGS. 8 and 9 are sectional views of the side molding portions ($M_2$) and the upper molding portion $M_{2b}$) of the molding ($M_2$) in accordance with another embodiment of the present invention.

DESCRIPTION OF THE PREFERRED EMBODIMENTS

Hereinafter, a molding ($M_1$) in accordance with the present invention and its molding apparatus will be explained with reference to FIGS. 1 to 7.

Figure 1:
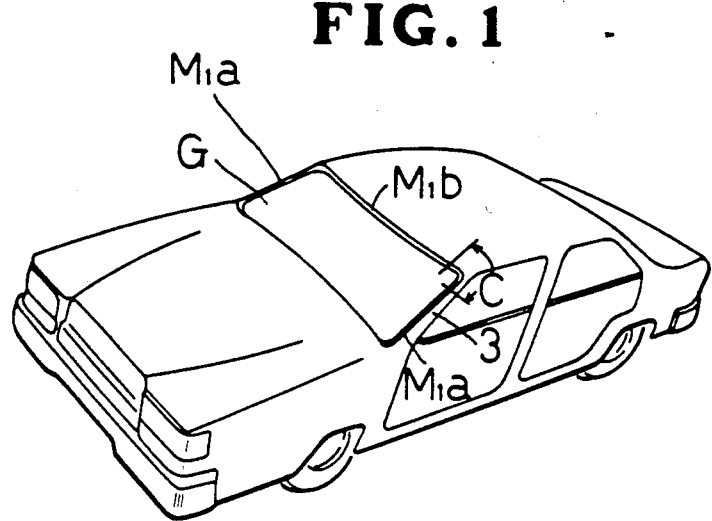
Figure 2:
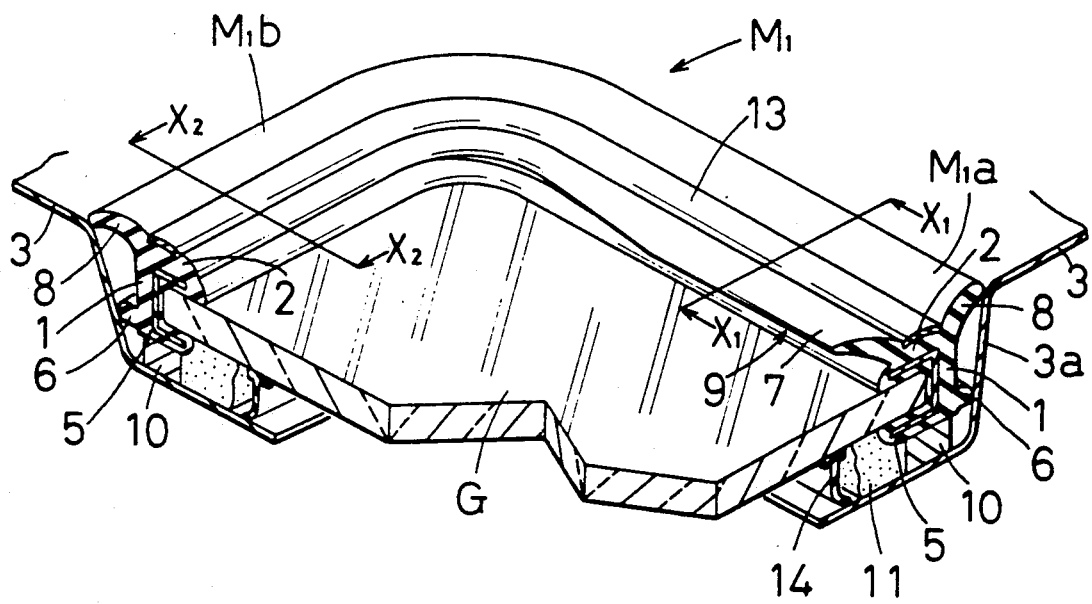

As shown in FIGS. 1 and 2, a molding ($M_1$) comprises side molding portions ($M_{1a}$) and an upper molding portion ($M_{1b}$) that are to be fitted to the side portions and upper portion of a windshield (G) and are molded integrally by a later-described molding apparatus.

Figure 3:
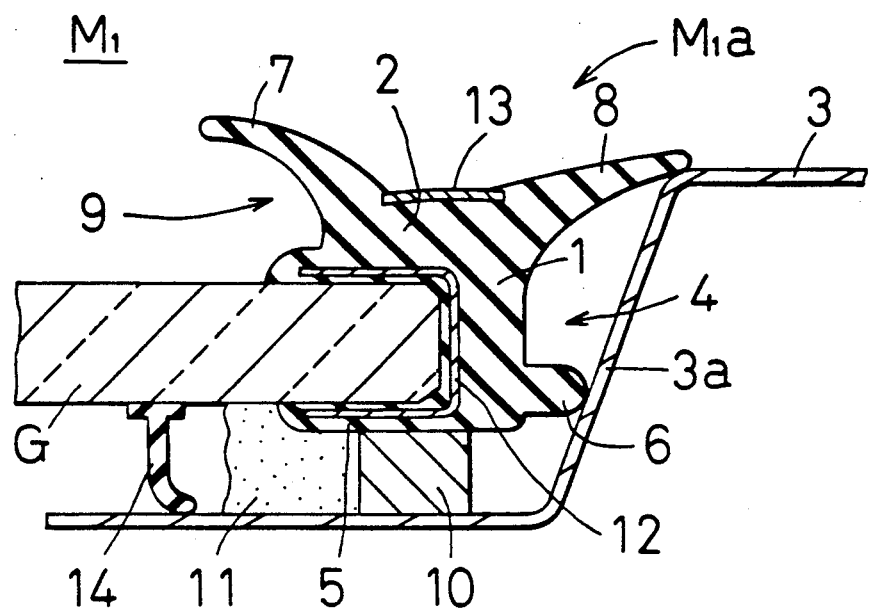
Figure 4:
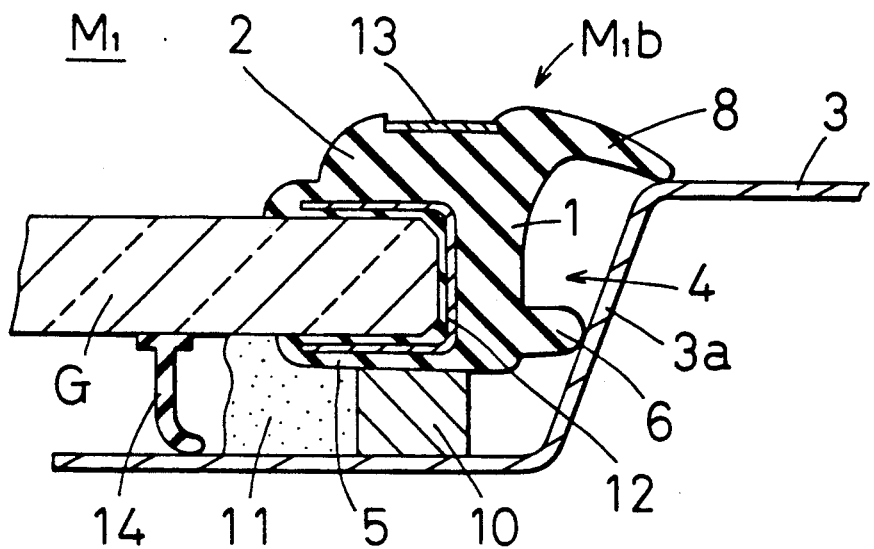

As shown in FIGS. 2 to 4, each of the side molding portions ($M_{1a}$) and the upper molding portion ($M_{1b}$) consists of a leg portion 1 and a decoration portion 2 which is molded integrally with the upper part of this leg portion 1. The leg portion 1 of each of the side molding portions (M$_{1a}$) and the upper molding portion (M$_{1b}$) is fitted into the gap 4 occurring between the peripheral edge portion of the windshield (G) and a body panel 3 of a window frame, and the decoration portion 2 covers the gap 4.

A clamp lip 5 is formed inside the lower end of the leg portion 1 of the side molding portion (M$_{1a}$). A panel lip 6 is outside of the clamp lip 5 in such a manner as to protrude as shown in FIGS. 2 and 3. A groove lip 7 is formed inside the decoration portion 2, and a decoration lip 8 is formed outside the groove lip 7 in such a manner as to protrude. The side molding portion (M$_{1a}$) is fitted to the side portion of windshield (G) by the decoration portion 2 and the clamp lip 5 disposed at the lower end portion of the leg portion 1. The panel lip 6 comes into resilient contact with a slope portion 3a of the body panel 3 and the decoration lip 8 comes into resilient contact with the upper surface of the body panel 3. The groove lip 7, which is formed projectingly on the inner peripheral side of the decoration portion 2 of the side molding portion (M$_{1a}$), and front glass (G) defines a rain water guide groove 9 therebetween.

As shown in FIGS. 2 and 4, the groove lip 7 is not disposed at the decoration portion 2 of the upper molding portion (M$_{1b}$) Only this structure is different from the structure of the side molding portion (M$_{1a}$). The rest of the structure is exactly the same. Therefore, the rain water guide groove 9 is not formed in the upper molding portion (M$_{1b}$) between it and the windshield (G). Incidentally, the thickness and width of the decoration portion 2 in each of the side molding portion (M$_{1a}$) and the upper molding portion (M$_{1b}$) are the same.

As shown in FIG. 2, the projecting length of the groove lip 7 which is formed projectingly in the decoration portion 2 of the side molding portion (M$_{1a}$) becomes progressively greater from the corner portion to the side portion of the molding (M$_1$), but along the side molding portion (M$_{1a}$), it is constant throughout its full length. The side molding portion (M$_{1a}$) and the upper molding portion (M$_{1b}$) are integral with each other, and the rain water guide groove 9 defined between the groove lip 7, which is formed projectingly on the inner peripheral side of the decoration member 2 of the side molding portion (M$_{1a}$), and the windshield (G), disappears at the connecting portion with the upper molding portion (M$_{1b}$).

When the front glass (G) is fitted into the window frame of the body under the state where this molding (M$_1$) is fitted onto the peripheral edge portion of the windshield (G), it is positioned with respect to the body panel 3 by a support 10 which is bonded to the lower surface of the clamp lip 5 of the molding (M$_1$) and the windshield (G) is bonded and fixed to the body panel by a sealant 11 sealed between the body panel 3 and the windshield (G). Since the front glass (G) is thus bonded and fixed to the body panel 3, the molding (M$_1$) is fitted into the gap 4 defined between the peripheral edge portion of the windshield (G) and the window frame of the body and this gap 4 is thus sealed.

A reinforcing core material 12 is buried into the leg portion 1 of the molding (M$_1$) and a decoration tape 13 is bonded to the upper surface of the decoration portion 2. Incidentally, reference numeral 14 in FIGS. 2 to 4 represents a rubber dam for preventing the outflow of the sealant 11.

Figure 5:
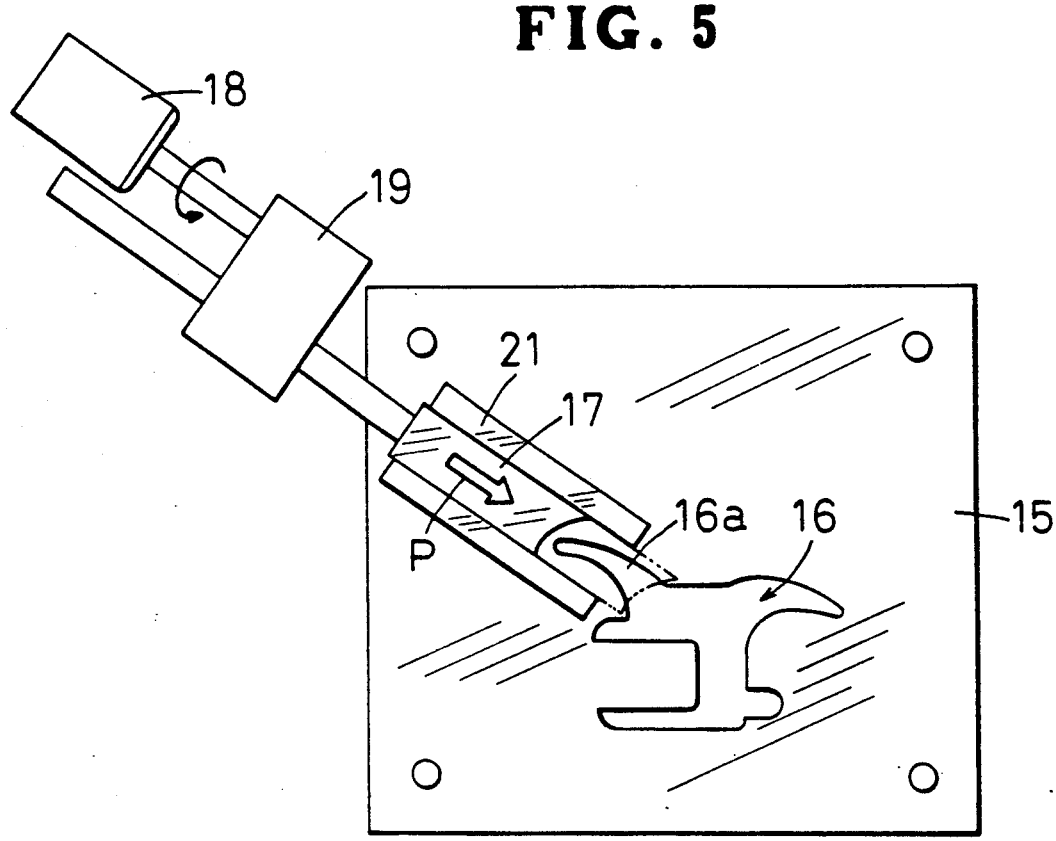

Next, the molding apparatus for molding the molding (M$_1$) will be explained with reference to FIG. 5.

An extrusion molding port 16 corresponding to the sectional shape of the side molding portion (M$_{1a}$) is disposed in a basic molding die 15 and a movable molding die 17 is disposed on the front surface of the basic die 15 in such a manner as to partially cover the extrusion molding port 16 and to be capable of moving back and forth. The movable molding die 17 is capable of moving back and forth in the longitudinal direction of a portion 16a of the extraction molding port 16 which is to form the groove lip 7 of the molding (M$_1$). The rotation of a driving motor 18 is converted to linear motion by a conversion mechanism 19 so that the movable molding die 17 can move back and forth while being guided by a guide member 21. A solid line and a two-dot-chain line in FIG. 5 represent the molding state of the side molding (M$_{1a}$) and the upper molding portion (M$_{1b}$), respectively.

Figure 6:
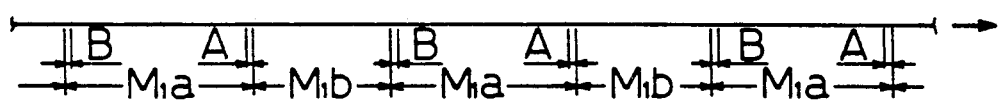
Figure 7:
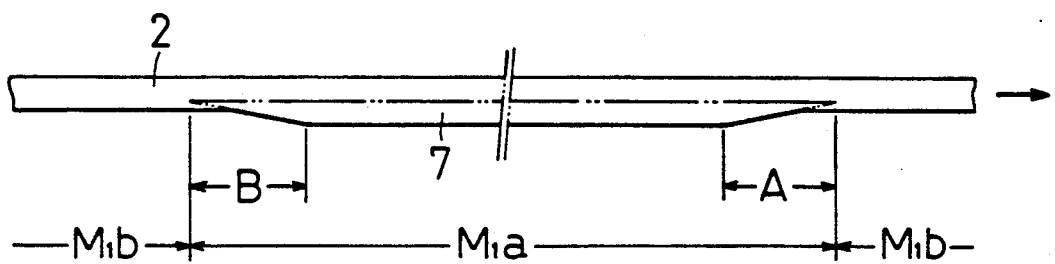

As shown schematically in FIGS. 6 and 7, molding of the side molding portion (M$_{1a}$) can be shifted to molding of the upper molding portion (M$_{1b}$) in the following way (the shift portion being represented by (A) in FIGS. 6 and 7). Namely, when the movable molding die 17 is gradually moved forth in the direction of arrow (P) during molding, the projecting length of the groove lip 7 becomes progressively smaller and molding can be shifted to the molding of the upper molding portion (M$_{1b}$).

On the contrary, molding of the upper molding portion (M$_{1b}$) can be shifted to molding of the side molding portion (M$_{1a}$) in the following way (the shift portion being represented by (B) in FIGS. 6 and 7). Namely, when the movable molding die 17 is gradually moved back in the direction opposite to the above during molding, the projecting length of the groove lip 7 becomes progressively greater and molding can be shifted to molding of the side molding portion (M$_{1a}$).

The elongated molding which is continuously molded in this manner is cut at predetermined positions and when it is bent at the connecting portion between the side molding portion (M$_{1a}$) and the upper molding portion (M$_{1b}$), the intended molding (M$_1$) can be obtained.

Figure 8:
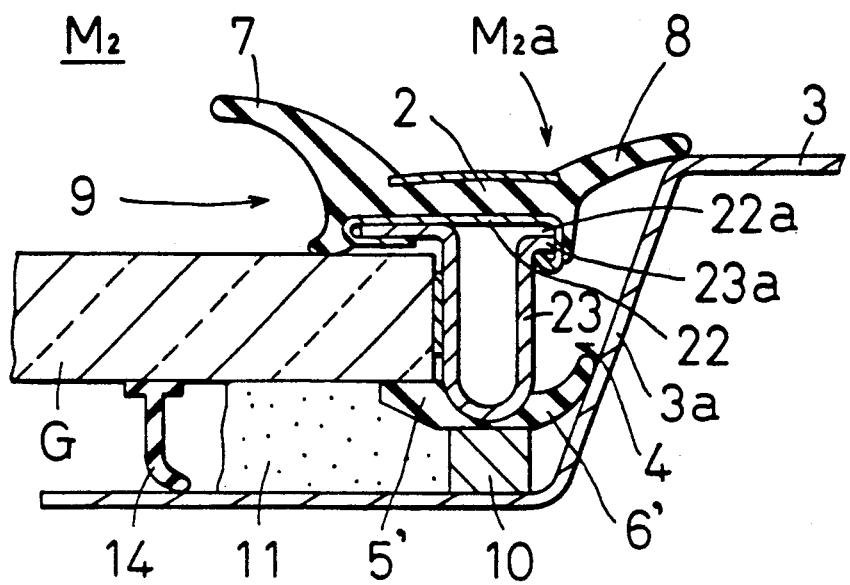
Figure 9:
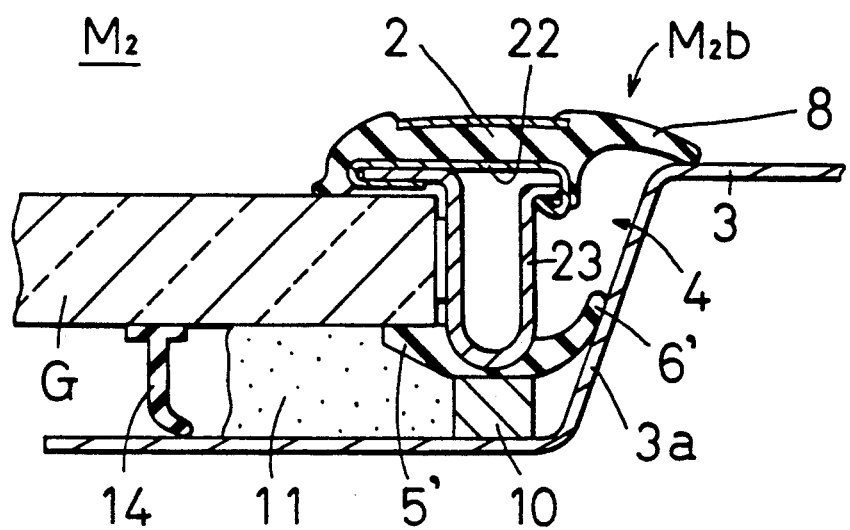
Figure 10:
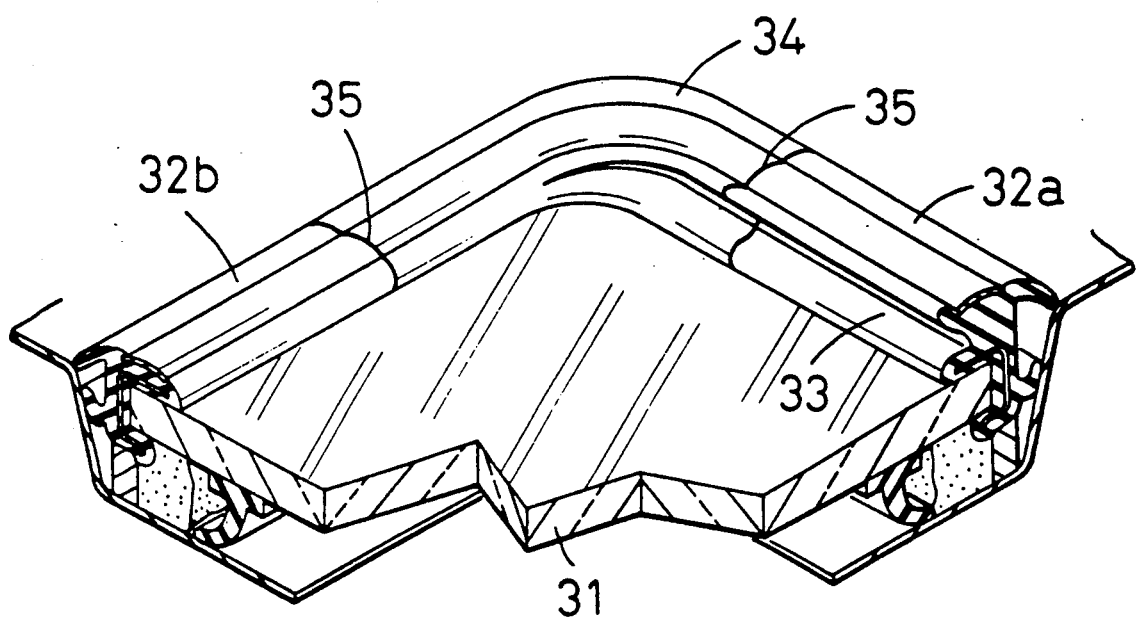
FIG. 10 is a sectional perspective view of a corner portion of a conventional molding.

FIGS. 8 and 9 show the molding (M$_2$) in accordance with another embodiment of the present invention, and the explanation thereof will be given by using the same or equivalent reference numerals as with the molding (M$_1$) of the embodiment described above.

In this molding (M$_2$), a metal 22 obtained by bending and shaping a metal sheet is integrally fitted to the lower surface of the decoration portion 2 and a fitting portion 23a of another metal 23, which is U-- shaped, is fitted into an insertion groove 22a of the metal 22. The clamp lip 5' and the panel lip 6' are fitted integrally to the lower end portion of the metal 23. Though the groove lip 7 is formed projectingly on the inner peripheral side of the decoration portion 2 of the side molding portion (M$_{2a}$), it is not disposed at the same portion of the upper molding portion (M$_{2b}$) and the side molding portion (M$_{2a}$) and the upper molding portion (M$_{2a}$) are shaped integrally so that the projecting length of the groove lip 7 becomes progressively greater at the connecting portion between them.

The molding (M$_2$) is fitted to the peripheral edge portion of the windshield (G) by the decoration portion 2 and the clamp lip 5'. In this embodiment, the U-shaped metal 23 plays the function of the leg portion of the molding (M$_2$).

What is claimed is:

1. A molding for a windshield, comprising:

an upper molding portion;

corner molding portions at opposite ends of said upper molding portion, said corner portions being integral with said upper molding portion; and side molding portions integral with said corner portions, only said side molding portions having a groove lip extending therefrom for defining a rain water guide groove, said groove lip of each said side molding portion having a projection length which progressively increases from said corner portions to said side portions;

wherein each said molding portion comprises an upper decoration portion, a lower clamp lip and a metal fitting connecting said upper decoration portion to said lower clamp lip.

2. The molding of claim 1, wherein said metal fitting is U-shaped in section with its open end connected to said upper decoration portion and its closed end connected to said lower clamp lip.

3. The molding of claim 2, wherein said upper decoration portion has a second metal fitting connected to its underside defining an insertion groove for connection to said open end of said U-shaped metal fitting.

4. The molding of claim 1, wherein said groove lips of said side molding portions extend from said upper decoration portions thereof.

5. The molding of claim 1, wherein said upper decoration portions each have a decoration lip extending therefrom.

6. The molding of claim 1, wherein said lower clamp lips each have a panel lip extending therefrom for engagement with a mounting panel.

* * * * *